(12) United States Patent
Garrett

(10) Patent No.: US 7,782,984 B2
(45) Date of Patent: Aug. 24, 2010

(54) METHOD OF SPHERE DECODING WITH LOW COMPLEXITY AND GOOD STATISTICAL OUTPUT

(75) Inventor: David Garrett, Old Bridge, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1621 days.

(21) Appl. No.: 10/804,411

(22) Filed: Mar. 19, 2004

(65) Prior Publication Data

US 2005/0210039 A1    Sep. 22, 2005

Related U.S. Application Data

(63) Continuation-in-part of application No. 10/231,980, filed on Aug. 30, 2002, now Pat. No. 7,609,777.

(51) Int. Cl.
 *H04L 27/06* (2006.01)
(52) U.S. Cl. ............... 375/340; 375/341; 375/324
(58) Field of Classification Search ......... 375/315, 375/316, 324, 340, 341
See application file for complete search history.

(56) References Cited

U.S. PATENT DOCUMENTS

| | | | |
|---|---|---|---|
| 6,834,088 B2 * | 12/2004 | Agami et al. ............ | 375/324 |
| 2002/0122510 A1 * | 9/2002 | Yakhnich et al. ........ | 375/342 |
| 2003/0076890 A1 | 4/2003 | Hochwald et al. ....... | 375/264 |
| 2004/0019842 A1 * | 1/2004 | Argon et al. ............. | 714/755 |
| 2004/0042565 A1 * | 3/2004 | Garrett ..................... | 375/341 |
| 2004/0181419 A1 * | 9/2004 | Davis et al. .............. | 705/1 |
| 2005/0175122 A1 * | 8/2005 | Nefedov et al. .......... | 375/323 |
| 2005/0283702 A1 * | 12/2005 | Wu et al. .................. | 714/752 |

OTHER PUBLICATIONS

Chan et al ("A Simple Taboo-Based Soft Decision Decoding Algorithm for Expander Codes"; IEEE Communications Letters, vol. 2, No. 7, pp. 183-185, Jul. 1998).*

Lei et al, "Reduced Complexity Maximum Likelihood Detection for V-Blast Systems"; IEEE Military Communications Conference, 2003 MILCOM, vol. 2, pp. 1386-1391, Oct. 2003.*

David Garrett, et al, "APP processing for high performance MIMO systems," *IEEE Custom Integrated Circuits Conference, CICC*, New York, NY, Conf. 25, (Sep. 21, 2003), pp. 271-274.

David C. Garrett, et al, "19.2 Mbit/s 4 × 4 BLAST/MIMO detector with soft ML outputs," *Electronics Letters, IEE Stevenage, GB*, vol. 39, No. 2, (Jan. 23, 2003), pp. 233-235.

Haris Vikalo, et al, "Modified Fincke-Pohst algorithm for low-complexity iterative decoding over multiple antenna channels," *IEEE International Symposium on Information Theory*, New York, NY, (Jun. 30, 2002), p. 390.

(Continued)

*Primary Examiner*—Temesghen Ghebretinsae
(74) *Attorney, Agent, or Firm*—John Ligon

(57) ABSTRACT

A symbol vector received from a multiple antenna transmitting array is detected using a sphere decoder. The sphere decoder is used to select from a set of candidate binary strings that string which is most likely to have been transmitted. Soft information for use in a turbo decoder or the like is obtained by considering cost functions for a set of candidate strings, including strings derived from the most likely string by flipping one or more bits thereof.

3 Claims, 4 Drawing Sheets

OTHER PUBLICATIONS

European Search Report, Appl. No. 05251289.4-2415 PCT/, (Jul. 11, 2005).

U.S. Appl. No. 10/389,390, filed Mar. 15, 2003, Davis et al.

David Garrett, Linda Davis, Stephan ten Brink, and Bert Hochwald, "*APP Processing for High Performance MIMO Systems*," In Proc. Custom Integrated Circuits Conference, Sep. 2003, pp. 271-274.

David Garrett, Lina Davis, Stephan ten Brink, and Bert Hochwald, "*Silicon Complexity for Maximum Likelihood MIMO Detection using Spherical Decoding*,"to appear in IEEE Journal on Solid-State Circuits, Summer 2004.

Garrett, D.C., Davis, L.M., and Woodward, G.K., "*19.2 Mbit/s 4× 4 BLAST/MIMO detector with soft ML outputs*," Electronics Letters, vol. 39, No. 2, $23^{rd}$ Jan. 2003.

Hochwald, B.M., ten Brink, S., "*Achieving Near-Capacity on a Multiple-Antenna Channel*," IEEE Transactions on Communications, vol. 51, No. 3, Mar. 2003.

\* cited by examiner

US 7,782,984 B2

METHOD OF SPHERE DECODING WITH LOW COMPLEXITY AND GOOD STATISTICAL OUTPUT

This application is a continuation in part of U.S. patent application Ser. No. 10/231,980, filed Aug. 30, 2002, and issued Oct. 27, 2009 as U.S. Pat. No. 7,609,777.

CROSS-REFERENCE TO RELATED APPLICATIONS

The subject matter hereof is related to that of the herewith commonly owned U.S. patent application Ser. No. 10/389,690, filed on Mar. 15, 2003 by L. M. Davis et al. under the title "Spherical Decoder for Wireless Communications, and published on Sep. 16, 2004.

FIELD OF THE INVENTION

This invention relates to maximum likelihood detectors for recovering transmitted signals. More specifically, the invention relates to applications of sphere decoders to the recovery of information transmitted from multiple-antenna arrays.

ART BACKGROUND

In the field of wireless communications, Multiple Input Multiple Output (MIMO) techniques are gaining interest because of the high data rates they can achieve. In MIMO communications, transmitted data symbols are distributed over multiple transmit antennas, and the received symbols are distributed over multiple receive antennas. Because each receive antenna senses a composite signal with contributions from each of the transmit antennas, signal processing is needed to reconstruct the original data symbols which were transmitted. In many cases, this signal processing relies upon a channel matrix H, which expresses the change in amplitude and phase undergone by a constant-valued pulse in transit from each transmit antenna to each receive antenna. H is generally estimated from measurements of pilot signals.

A maximum likelihood (ML) detector with a posteriori probability (APP) information has proven very effective in MIMO receivers. This form of detection is especially useful because it provides so-called "soft" information about the decoded bits. Soft-input decoders, such as turbo decoders, use the soft information to correct errors in suitably coded bit streams. Typically, the soft data associated with a given detected bit consists of an eight-bit word which expresses a log-likelihood ratio (LLR), on a scale of −127 to +127, of the two possible outcomes (i.e., logical 1 or logical 0) of detecting the given bit.

At the transmitter, according to some MIMO schemes, a data word x consisting of a binary string is mapped to a vector symbol s. The vector symbol has as many components as there are transmit antennas. Each component is selected from an appropriate constellation of (possibly complex) symbols, such as a QPSK or QAM constellation. Herein, I refer to such symbols as scalar symbols. In transmission, each transmit antenna sends a respective one of the selected scalar symbols.

The antenna responses at the receiver are symbolized by the vector y, which contains a respective component from each of the receive antennas.

The effect of the propagation channel is modeled by the equation $y=Hs+n$, wherein n is a vector that represents additive noise.

The object of ML-APP detection is, given y, to determine that value of s (or, equivalently, of x) which minimizes the cost function $J=\|Hs-y\|^2$ as well as determine the LLRs for each for the bits in the data word x. The search for the minimizing value of s is constrained to the lattice defined by the discrete scalar symbols of the constellation.

Various methods have been proposed for conducting the search for the minimizing value of s. Although exhaustive searching can lead to extremely low bit-error rates (BERs), it becomes intractably complex for reasonably sized constellations when there are more than two or three transmit antennas. Therefore, other methods have been proposed which perform less than an exhaustive search.

One such method is the sphere decoder, which has been described, for example, in David Garrett et al., "APP Processing for High Performance MIMO Systems," in *Proc. Custom Integrated Circuits Conference*, September 2003, pp. 271-274; and David Garrett et al., "Silicon Complexity for Maximum Likelihood MIMO Detection using Spherical Decoding," to appear in *IEEE Journal on Solid-State Circuits*, Summer 2004.

The sphere decoder is also described in the above-cited U.S. patent application Ser. No. 10/389,690. I hereby incorporate the entirety of said patent application Ser. No. 10/389,690 herein by reference.

Each scalar symbol transmitted from an antenna is meant to convey a portion of the binary string x. For a given received signal vector y, the sphere decoder conducts a tree search. Each level of the tree corresponds to a respective one of the transmit antennas in accordance with an ordering that has been imposed on them. At each level of the tree, there are as many branches per node as there are scalar symbols for the pertinent antenna to choose from. Thus, a path from the root of the tree to a leaf will accrue a portion of a binary string at each node, and each leaf of the tree corresponds to one of the candidates for the full string x.

The sphere decoder does not consider every leaf of the tree. Instead, a radius r is chosen. Along with the string portion that is accrued at each node, a corresponding contribution to the cost function J is also accrued. If, at a given node, J (as accrued to that point) is found to exceed r, the nodes that are children to the given node are declared outside the search radius and are not considered. As a result, great reductions in complexity relative to the exhaustive search can be achieved.

Still further reductions in complexity can be achieved if the sphere is permitted to shrink. That is, each time a candidate string is found that satisfies the condition J<r, the radius is set to a smaller value.

As with other types of ML-APP detection, the sphere decoder returns soft data that is useful in iterative decoding of the output binary string. However, it has been observed that because the scope of the search is often drastically cut back, the quality of the soft data can be impaired. Thus, there has been a need for a detection method that enjoys the benefits of sphere decoding while preserving the quality of soft data.

SUMMARY OF THE INVENTION

We have found such a detection method. Our method is a sphere decoder applied substantially as described above to search for and obtain that binary string which solves the constrained ML problem. Such string is denominated the most likely binary string. We also compute a LLR for each bit of the binary string. The computation of the LLR is responsive not only to the partial strings that have been considered during the search, but also to a further set of binary strings. The further set comprises every bit string that can be obtained by flipping one or more bits of the most likely string. In specific embodiments of the invention, each further string is obtained by flipping precisely one bit of the most likely string.

DETAILED DESCRIPTION

Figure 1:
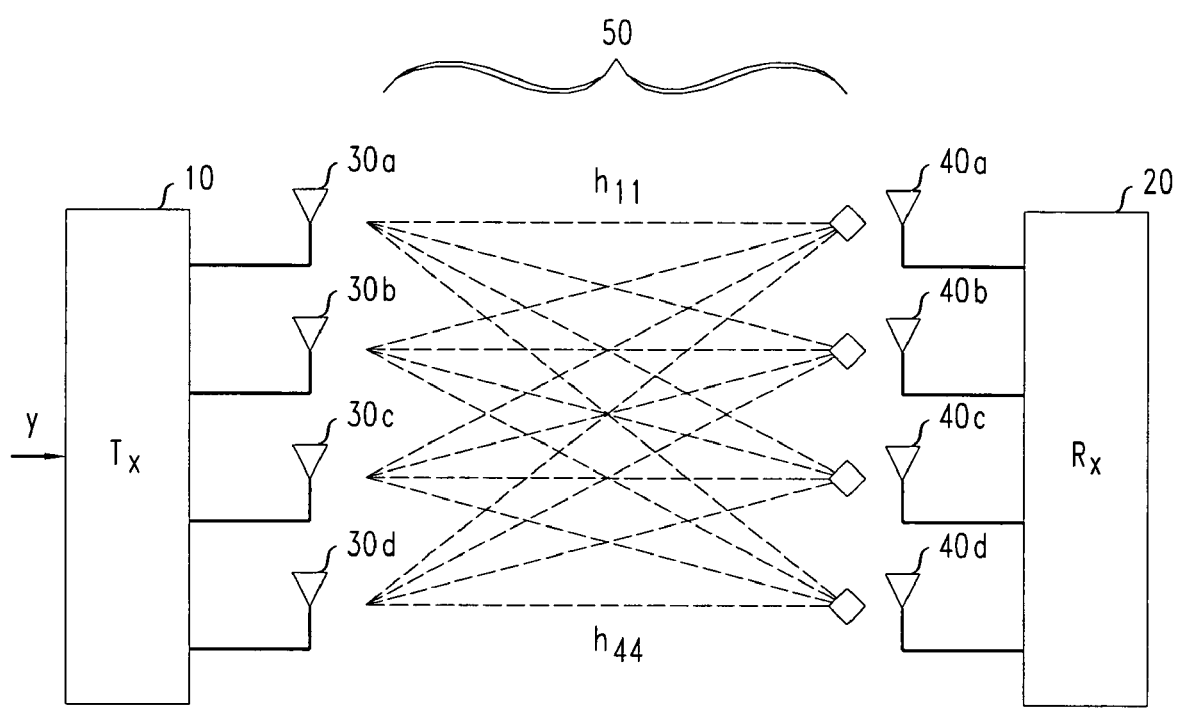
FIG. 1 is a conceptual diagram of a MIMO communication system known in the prior art.

In FIG. 1, transmitter 10 and receiver 20 communicate across propagation channel 50 via four transmit antennas 30a-30d and four receive antennas 40a-40d. More generally, there are M transmit antennas indexed 0, 1, . . . , M−1, and N receive antennas indexed 0, 1, . . . , N−1. Channel 50 is characterized by an N×M channel matrix H having coefficients $h_{ij}$. Two such coefficients are indicated in the figure.

Each concurrent transmission of one scalar symbol from each transmit antenna is referred to as a "channel use." To prepare for each channel use, a binary string x is mapped to a vector symbol $s=(s_0, s_2, \ldots, s_{M-1})$, wherein each of the $s_i$ is a scalar symbol selected from the constellation. If the total number of symbols in the constellation is P, then $Q=\log_2 P$ is the number of bits per symbol. Thus, a binary string Q bits long is mapped to each scalar symbol, and the length of the complete binary string to be transmitted in one channel use is MQ.

As noted, the receiver searches for that candidate vector symbol s which minimizes a cost function J defined above as $J=\|y-Hs\|^2$. We now define a new cost function which is more convenient but equally valid for purposes of the search which is to be described. Hereinafter, J will denominate the new cost function.

(1) $H^H H$ is an M×M matrix wherein the superscript H denotes complex transposition. By well-known linear algebraic methods, an upper triangular matrix U is readily obtained, which satisfies $U^H U = H^H H$.

(2) The pseudoinverse of H is the matrix $(H^H H)^{-1} H^H$. Given y, a rough approximation to the ML solution is the unconstrained ML solution $\hat{s} = (H^H H)^{-1} H^H y$.

(3) Given a candidate vector symbol s, the new cost function is defined by $J = (s-\hat{s})^H U^H U (s-\hat{s})$. Thus, for purposes of the sphere search, for any given vector symbol that is input from the receive antennas, the center of the sphere is the vector $\hat{s}$.

At the receiver, known techniques of MIMO signal processing are used to recover (generally in corrupted form) the scalar symbol sent by each transmit antenna, and provide it as input to the sphere decoder. Then, the sphere decoder compares each input symbol with at least some of the candidate symbols. As shown, e.g., in FIG. 2, the comparison process is conducted according to a tree search.

Figure 2:
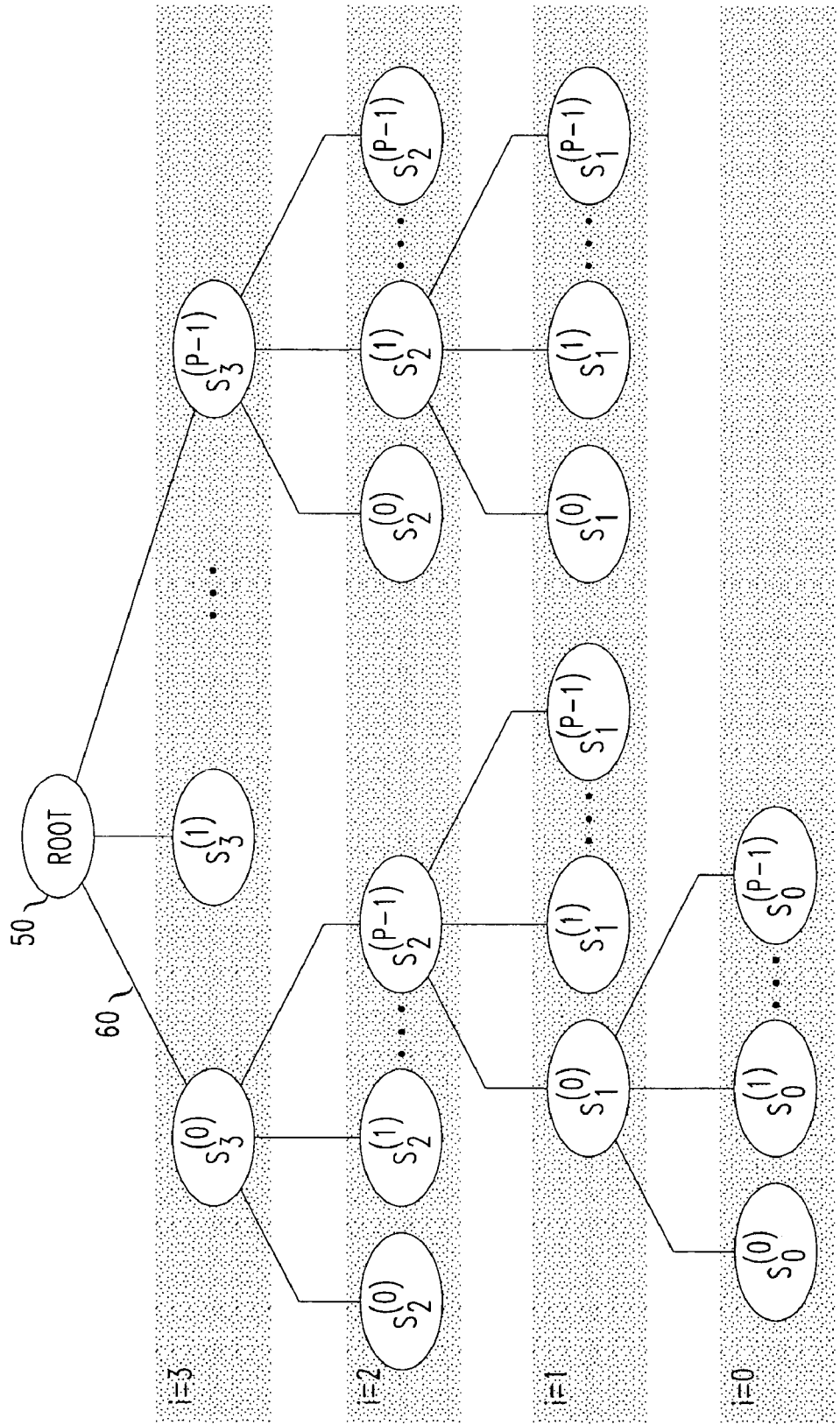
FIG. 2 is a diagram illustrating a tree search as known in the prior art.

Turning to FIG. 2, it will be seen that in the example represented there, there are four transmit antennas indexed by i=0, 1, 2, 3. There are P candidate scalar symbols, indexed by p=0, 1, 2, . . . , P−1. Thus, the pth candidate symbol at the ith transmit antenna is denominated $s_i^{(p)}$.

Beginning at root 50 of the tree, the search proceeds downward in sequence from level i=3, representing the last transmit antenna, to the leaves of the tree at level i=0, representing the first transmit antenna. At each level, the cost function is incremented for each candidate symbol, those candidate symbols for which the radius test is satisfied are saved for the search at the next level, and those that fail the radius test are discarded. The method for incrementing the cost function will be described below.

Each candidate symbol that is saved contributes a segment Q bits long to a candidate binary string. One complete trajectory through the tree is indicated in FIG. 2 by the edges drawn with a heavy line and designated by the reference numeral 60. If, e.g., there are four symbols in the constellation (i.e., P=4), then each symbol contributes two bits, and the complete binary string represented by trajectory 60 is 00110001.

The cost function J can be rewritten in a recursive form that facilitates computation. Let the coefficients of the matrix U be denominated $u_{ij}$, and for each pair (i, j) define $q_{ij} = (u_{ij}/u_{ii})$. Furthermore, for the ith transmit antenna, define $$Innersum(i) = \sum_{j=i+1}^{M-1} q_{ij}(s_j - \hat{s}_j),$$

and define $Increment_p(i) = u_{ii}^2 \cdot |s_i^{(p)} - \hat{s}_i + Innersum(i)|^2$. In the expression for Innersum(i), the symbols $s_j$ are not indexed by p, i.e., by candidate symbol, because levels j=i+1, . . . , M−1 have already been traversed and the corresponding candidate symbols for the given trajectory have already been determined. By contrast, at the new search level i, each of the P possible choices of candidate symbol will lead to a different value for $Increment_p(i)$ and will of course be the branching-off point for a different trajectory.

With this nomenclature, the partial cost function computed at the ith level of the search tree is $$\sum_{k=i}^{M-1} Increment_{p(k)}(k),$$

where we have expressly indicated that the choice p of candidate symbol may be different for each level k of the search. Let Outersum(i) denote the partial cost function at the ith level. We thus have the recursive formula $Outersum_p(i) = Outersum(i+1) + Increment_p(i)$. Working downward through the search tree (as seen in FIG. 2), i.e., with decreasing values of i, the search engine only needs to compute $Increment_p(i)$ at each new level for each of the candidate symbols.

Figure 3:
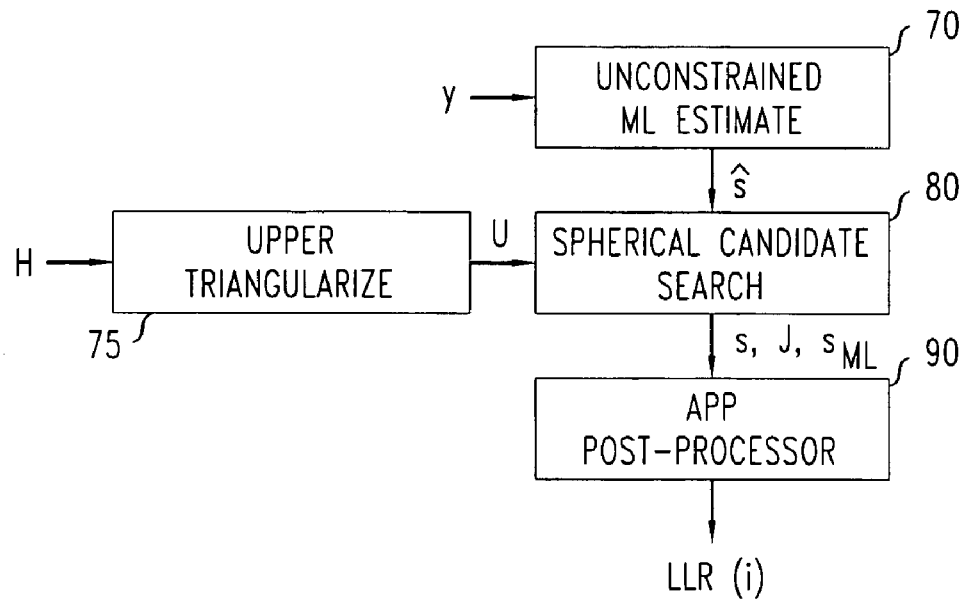
FIG. 3 is a conceptual flow diagram of a sphere decoder.

FIG. 3 shows the overall flow for the sphere-decoding process. For a given input vector y, block 70 computes the unconstrained ML estimate $\hat{s}$, which is provided as input to block 80. Block 75 performs the upper triangularization of the matrix H to obtain the matrix U. This result can be reused and thus can be used for one or more input vectors y. Block 80 is the search engine that performs the tree search described above. For a given input vector y, the output of block 80 will include all candidate vector symbols s (or their equivalent binary strings) which have satisfied the radius test. Together with each candidate vector symbol s, the search engine at block 80 also provides the associated value J=Outersum(0) of the cost function.

When performed in accordance with the present invention, the output of the operations associated with block 80 will also typically include the most likely candidate vector, $s_{ML}$. The vector $s_{ML}$ is indicated in FIG. 3 as included in the output of block 80.

Block 90 is the APP post-processor. Taking the candidate vector symbols and their associated cost functions as input, the object of block 90 is to output a vector having the same dimension as x, i.e., having MQ entries, in which each entry is the log likelihood ratio (LLR) for a corresponding bit of x.

Figure 4:
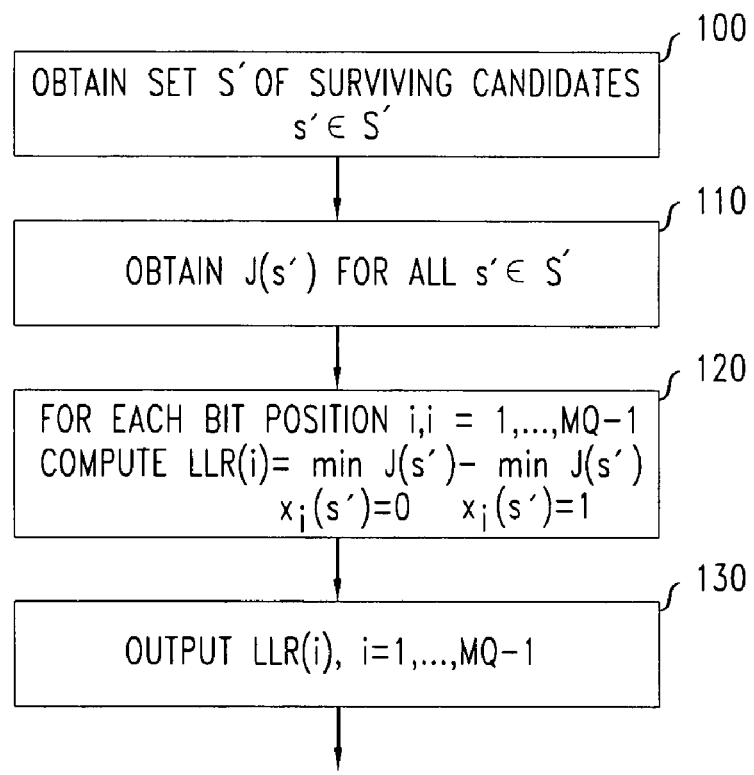
FIG. 4 is a conceptual flow diagram of a post-processor for a sphere decoder known in the prior art.

One version of the APP post-processor is described in the above-cited patent application Ser. No. 10/389,690. FIG. 4 provides a functional flow diagram of such a post-processor of the prior art. The output of a sequence of processing steps, represented in the figure by blocks 100-130, includes a vector of log likelihood ratios LLR(i), i=1, ..., MQ−1.

As indicated at block 100 of FIG. 4, those candidate vector symbols s which have survived the sphere search are obtained. The set of surviving candidates is denoted in the figure as set S'. At block 110, the value of cost function J(s') is obtained for each of the candidate vectors s' in the set S'.

In at least some cases, it will be advantageous to include in S' some or all of the leaf nodes that have been tested but have failed the radius test, in order to provide good soft information.

At block 120, LLR(i) is computed for each bit position i according to the formula, $$LLR(i) = \min_{x_i(s')=0} J(s') - \min_{x_i(s')=1} J(s').$$

In the formula, the first term is the result of searching for the least cost, over those members of S' which have a 0 bit in the ith position. Similarly, the second term is the result of a search over those members of S' which have a 1 bit in the ith position. The resulting LLR vector is output at block 130.

In some cases, a bit cost may fail to be computed, due to insufficient data. In such a case, an imputed value, such as an average value, may be imputed at the pertinent position i of the LLR vector.

It will be understood that FIG. 4 and the accompanying diagram is merely illustrative. Those skilled in the art will appreciate that various algorithms will bring about essentially equivalent results. All such algorithms are envisaged as lying within the scope of the present invention.

In certain embodiments of our new decoding procedure, we employ a sphere search with a shrinking radius. Because the radius shrinks rapidly at least in the initial stages of the search, the selection of the initial radius is not critical, provided it is not too small. The sphere search is carried out substantially as described above. However, each time the search reaches a leaf of the search tree, i.e., a node at the level i=0, the radius is updated with the lesser of the current value and the value at the new leaf.

As above, each leaf that the search reaches is forwarded to the post-processor as a candidate vector symbol. However, because the search tree is pruned as the radius shrinks, there will generally be fewer resulting candidates than there are in the case of a constant-radius search.

The shrinking radius search will also identify that candidate which is associated with the least cost J. We refer to that candidate as the most likely candidate, and we refer to the corresponding binary string $x_{ML}$ as the most likely string.

Our post-processor differs in certain important respects from the post-processor of FIG. 4. Our new post-processor is conveniently described with reference to FIG. 5.

Figure 5:
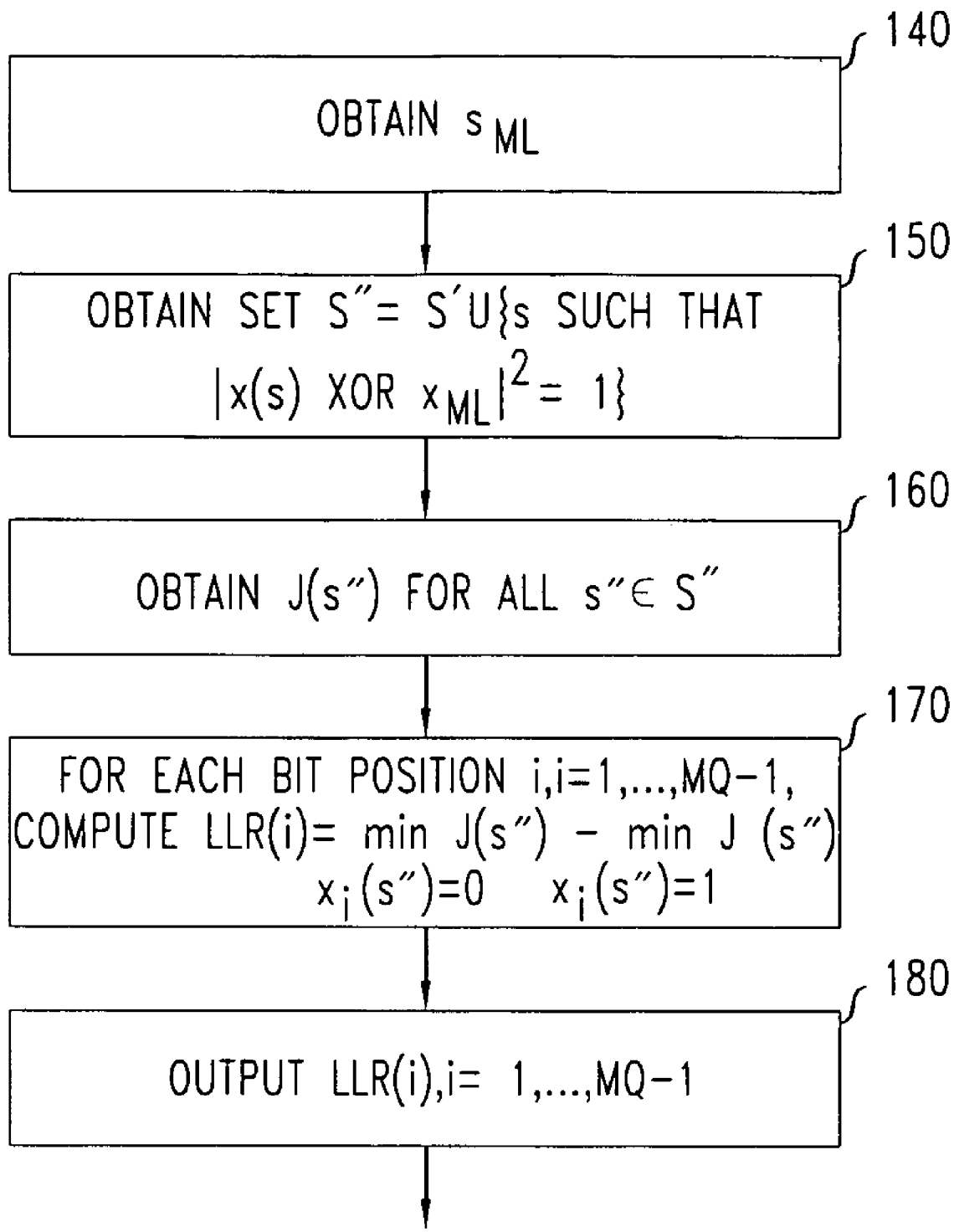
FIG. 5 is a conceptual flow diagram of a post-processor for a sphere decoder according to the principles of the present invention in one embodiment.

At block 140 of FIG. 5, we obtain the most likely candidate $s_{ML}$.

At block 150 of FIG. 5, we construct a set S'' of candidate vectors that consists of the union of set S' as defined above, with the set of all candidate vectors s for which the corresponding binary string x(s) differs from $x_{ML}$ in one or more bits. In an illustrative embodiment, the difference lies in precisely one bit. In such a case, the further set is the set of all candidate vectors s such that $|x_{ML} \oplus x(s)|^2 = 1$, wherein $\oplus$ denotes the parallel exclusive-or operation.

At block 160, we obtain the value of cost function J(s'') for all vectors s'' which are elements of set S''. At block 170, LLR(i) is computed for each bit position i according to the formula, $$LLR(i) = \min_{x_i(s'')=0} J(s'') - \min_{x_i(s'')=1} J(s'').$$

Importantly, the search is now carried out over the augmented search set S''. In the formula, the first term is the result of searching for the least cost, over those members of S'' which have a 0 bit in the ith position. Similarly, the second term is the result of a search over those members of S'' which have a 1 bit in the ith position. The resulting LLR vector is output at block 180.

It will be understood that FIG. 5 and the accompanying diagram is merely illustrative. Those skilled in the art will appreciate that various algorithms will bring about essentially equivalent results. All such algorithms are envisaged as lying within the scope of the present invention.

One advantage of our new procedure is that it provides better soft information for use in a turbo decoder or the like in the context of a sphere search with highly reduced complexity due, e.g., to a shrinking radius. With our method, it is not necessary to rely, for soft information, solely on the very small set of candidate vectors that survive a shrinking-radius sphere search. Instead, the results of the shrinking-radius sphere search, or other type of search, are augmented by additional candidate vectors that are highly likely to be useful because of the way they have been constructed.

I claim:

1. A method for decoding a received vector symbol which corresponds to a binary string having a plurality of bit positions, comprising:
    (a) performing a sphere search so as to obtain an initial set of candidate vectors including a most likely candidate vector; and
    (b) computing a log-likelihood ratio for each of said bit positions, wherein each said ratio is based on values of a cost function computed for at least some candidate vectors belonging to the initial set, and on values of the cost function for at least some further candidate vectors constructed by flipping one or more bits of the most likely candidate vector.

2. The method of claim 1, further comprising including in the initial set of candidate vectors at least one vector that has been excluded by the sphere search as lying outside a search radius.

3. The method of claim 1, wherein each of the at least some further candidate vectors is constructed by flipping precisely one bit of the most likely candidate vector.

* * * * *